United States Patent
Deisinger et al.

(10) Patent No.: US 8,096,889 B2
(45) Date of Patent: Jan. 17, 2012

(54) BOOT COMPRISING AN ATTACHMENT REGION WITH AT LEAST THREE CIRCUMFERENTIAL OUTSIDE RIBS

(75) Inventors: Markus Deisinger, Siegburg (DE); Ludger Wenning, Neunkirchen (DE); Joachim Wette, Hennef (DE); Andreas Berndt, Lohmar (DE)

(73) Assignee: GKN Driveline International GmbH, Lohmar (DE)

( * ) Notice: Subject to any disclaimer, the term of this patent is extended or adjusted under 35 U.S.C. 154(b) by 0 days.

(21) Appl. No.: 13/046,588

(22) Filed: Mar. 11, 2011

(65) Prior Publication Data

US 2011/0159971 A1     Jun. 30, 2011

Related U.S. Application Data

(63) Continuation of application No. PCT/EP2009/006540, filed on Sep. 9, 2009.

(51) Int. Cl.
*F16D 3/84*     (2006.01)

(52) U.S. Cl. .......................................... 464/175; 277/635

(58) Field of Classification Search .......... 464/173–175; 277/574, 634–636, 648, 649; 403/50, 51; 285/57, 145.5, 225–228, 299
See application file for complete search history.

(56) References Cited

U.S. PATENT DOCUMENTS

| | | | | |
|---|---|---|---|---|
| 2,265,615 A | * | 12/1941 | Stalter | 277/648 |
| 5,006,376 A | * | 4/1991 | Arima et al. | 464/175 |
| 5,094,894 A | * | 3/1992 | Schafferus et al. | 277/636 |
| 5,672,113 A | * | 9/1997 | Tomogami et al. | 464/175 |
| 5,725,433 A | * | 3/1998 | Kudo et al. | 464/175 |
| 6,089,574 A | * | 7/2000 | Sadr et al. | 464/175 |
| 6,464,233 B1 | * | 10/2002 | Oetiker | 277/636 |
| 7,238,114 B2 | * | 7/2007 | Wang et al. | 464/173 |
| 2005/0020366 A1 | * | 1/2005 | Scholtz et al. | 464/175 |
| 2005/0029750 A1 | * | 2/2005 | Deisinger et al. | 277/635 |
| 2006/0068925 A1 | * | 3/2006 | Sueoka et al. | 464/175 |
| 2006/0205523 A1 | * | 9/2006 | Toriumi et al. | 464/175 |
| 2006/0273528 A1 | * | 12/2006 | Schirmer | 277/635 |

FOREIGN PATENT DOCUMENTS

| | | | |
|---|---|---|---|
| DE | 10 2007 034760 A1 | | 2/2009 |
| DE | 102007034760 A1 | * | 2/2009 |
| EP | 0 669 476 A1 | | 8/1995 |
| EP | 1 950 439 A1 | | 7/2008 |
| JP | 04272514 A | * | 9/1992 |
| JP | 2005036945 A | | 2/2005 |
| JP | 2008-20074 | * | 1/2008 |

OTHER PUBLICATIONS

PCT International Search Report for PCT/EP2009/006540 dated Feb. 3, 2010.

* cited by examiner

*Primary Examiner* — Gregory Binda
*Assistant Examiner* — Josh Skroupa
(74) *Attorney, Agent, or Firm* — Rader, Fishman & Grauer, PLLC (57) ABSTRACT

A boot comprising a fold region and an attachment region is disclosed. The attachment region comprises an outside with at least two circumferential ribs extending from a base surface towards the outside and providing for a binder seat surface.

18 Claims, 8 Drawing Sheets

BOOT COMPRISING AN ATTACHMENT REGION WITH AT LEAST THREE CIRCUMFERENTIAL OUTSIDE RIBS

CROSS REFERENCE TO RELATED APPLICATIONS

This application is a Continuation Application claiming benefit of PCT/EP2009/006540, filed on Sep. 9, 2009, which claims priority to PCT Application No. PCT/EP2008/007561, filed on Sep. 12, 2008, which applications are hereby incorporated by reference in their entirety.

TECHNICAL FIELD

The present disclosure describes a boot comprising a fold region and an attachment region.

BACKGROUND

Due to the necessity of mounting boots on a joint casing by way of a binder element, a problem exists with respect to the fitting of the boot on the joint casing due to the stress exerted from the binder element and a flowing into spaces underneath the binder element, thereby loosening the connection with each other. In order to solve that problem, U.S. Pat. No. 5,094,894 proposes a boot with at least one collar region, comprising, on its outside, an annular groove with a rectangular or trapezoidal cross-section for a tensioning element, the annular groove being provided with a substantially flat bottom part resting against the tensioning element and is wider than an internal annular bead. The collar region, within the flat annular groove in the region of the internal annular bead, comprises at least one recess-like annular gap with a rectangular or trapezoidal cross-section whose cross-sectional depth is greater than its width. Further, on the inner surface of the collar region, resting against the joint casing, two annular beads are assigned to the two recess-like annular gaps shown in the Fig. of U.S. Pat. No. 5,094,894. However, the problem of the embodiment disclosed in U.S. Pat. No. 5,094,894 is that it may not be fixed in a defined axial position in an annular groove of a joint casing. The boot in accordance with U.S. Pat. No. 5,094,894 will show a high flexibility in the axial direction with respect to the fixing of the same by a binder element in an annular groove of a joint casing, whereby the flexibility will cause deformations during tensioning. Further, the pressure forces exerted by the binder element will flow in an uncontrolled way into the material of a boot in the binder seat region giving rise for sealing problems.

Thus, what is needed is a boot having increased sealing and fixing properties.

SUMMARY

An embodiment of a boot is disclosed, wherein an attachment region comprises a binder seat region with a binder seat surface and an outside with at least two circumferential ribs extending from a base surface towards the outside, and wherein the binder seat surface is provided by the circumferential outside ribs. In one exemplary arrangement, at least three, and in one specific exemplary embodiment, at least four, and in another specific exemplary embodiment, five or more, especially six, circumferential outside ribs are comprised from the attachment region. The boot may have two attachment regions, namely a first attachment region enabling a mounting of the boot of especially a joint casing with a greater diameter, and a second attachment region having a smaller diameter enabling, for example, a mounting on a shaft. With respect to the disclosure in this application, the term "attachment region" refers to both the first and/or second attachment region, for example, either the first or the second or both of the attachment regions may be embodied in the sense of the present disclosure. The binder seat surface lying within the binder seat region being defined by the region between an orientating side surface in a first side region of the attachment region being opposite the fold region of the boot and on the other side by an orientating side wall in a second side region of the attachment region arranged beneath the fold region. The binder seat surface is the surface underneath a binder element by which a boot in accordance with the disclosure may be fixed, for example, on a joint casing and/or shaft. The maximum extension of the binder seat surface is limited by the surface of the binder seat region. The binder seat surface is provided by the surface of the circumferential outside ribs directed to the outside.

The base surface, if viewed with respect to the cross-section of the attachment region in a direction of the main axis of the boot, is located underneath the binder seat surface, at least when no fixed binder element is present, but in one exemplary configuration, also if the boot in accordance with the disclosure is fixed by a binder element on, for example, a joint casing or a shaft. The maximum extension of the base surface in a direction of the main axis of the boot is equal to the maximum extension of the binder seat surface, thus being limited only by the width of the binder seat region. The base surface is part of a base comprised by the attachment region, supporting the circumferential outside ribs and, in a further exemplary embodiment, on the inside of the first attachment region being directed for example to a joint casing, at least one circumferential inside rib, and in one exemplary embodiment, two, three, four, and five or more circumferential inside ribs. The base further supports a ring element in the first side region of the attachment region being opposite the fold region of the boot, and in a further exemplary arrangement, also an arrangement mechanism. The ring element, as well as also the arrangement mechanism, if present, of the first side region provides for the orientating side surface defining one boundary of the binder seat region. On the second side region of the first attachment region being located near the fold region, the base supports a transition element providing for the orientating side wall defining the other boundary of the binder seat region as well as a transition area to the fold region of the boot.

In one exemplary arrangement, at least two circumferential outside ribs have a height H1 that is at the most equal or smaller than a height H2 of a base of the attachment region. In a cross-sectional view of the boot, in a direction of the main axis of the boot, the height H1 and/or the height H2 may be addressed as the thickness of the circumferential outside ribs or the thickness of the base. In another exemplary arrangement, the height H1 of the circumferential outside ribs is smaller than the height H2 of the base. In further arrangement, the at least one inside circumferential rib is assigned, at least in part, to at least two circumferential outside ribs.

Between the circumferential outside ribs, slits may be embodied. The slits abutting on the ring element or the arrangement mechanism in the first side region or the orientating side wall of the transition element in the second side region of the attachment region may have a bottom with a slightly curved shape in the transition from the orientating side surface of the first side region and/or the orientating side wall of the second side region. Further slits may have generally a nearly flat bottom. In one embodiment, nearly all of the slits may have the same cross-sectional depth, however, if especially only one or two circumferential inside ribs were present, slits assigned to said circumferential inside ribs may have a greater depth than the other slits between circumferential outside ribs. The height H2 defining the thickness of the base, however, is in each case defined by the bottom of the slit or slits having the lowest cross-sectional depth.

In a further embodiment, the area of the cross-sectional planes of all of the circumferential outside ribs is, at the most, equal or smaller; in a further embodiment smaller, than the area of the cross-sectional plane of the base of the attachment region.

By the provision of circumferential outside ribs providing for the binder seat surface for a binder element, it is possible to introduce pressure peaks into the base leading to a controlled flow of the pressure forces exerted by the binder element into the base material, thus leading to good sealing and fixing properties of the boot.

In a further exemplary embodiment, at least two or three circumferential inside ribs, especially arranged for engaging in an annular groove of a joint casing or a shaft, are arranged for being separated from each other by way of a groove having a depth D of around 0.25 mm at the most. In yet another embodiment, the depth D is in a region between about 0.04 mm to about 0.2 mm. In yet a further embodiment, the depth D is in a region between about 0.06 mm to about 0.15 mm. Due to the provision of at least two neighboring circumferential inside ribs being separated by a groove, and, in one arrangement, of at least four circumferential inside ribs, it is achieved that the annular groove on the joint casing is in contact mainly only with the surface of the ribs, and, thus, the radial stiffness is reduced without any impact on the axial stiffness in the binder seat region. In one embodiment, at least one circumferential inside rib is assigned to at least one slit embodied between two outside ribs. In one arrangement, a circumferential inside rib is at least in part assigned to two circumferential outside ribs. The circumferential inside rib or ribs are arranged for on the bottom of the base, and may be located at each position on the bottom of the base. If only one or two circumferential inside ribs were present, the same are located in the middle of the bottom of the base or in a region between the middle and the orientating side wall of the second side region of the attachment region. If more than four or five circumferential inside ribs were present, the same may be arranged for over the whole area of the bottom of the base and, yet another embodiment, being separated by a groove as defined above.

The boot disclosed herein may further comprise an additional circumferential rib arranged on a first side region of the attachment region being opposite to the fold region on the inside of the attachment region, the additional rib having at least two recesses to form at least two rib elements. Other embodiments may include at least four recesses or more, so that the additional rib may be defined as being composed of four or more rib elements, providing for a good positioning of the boot in an annular groove.

In another exemplary embodiment, the boot further comprises an additional circumferential rib arranged on a first side region of the attachment region being opposite to the fold region on the inside of said attachment region, the additional rib having a cross-sectional width that is at least 30 percent. In another embodiment, the additional rib has a cross-sectional width that is at least 40 percent, and in yet another embodiment, at least 45 percent, greater than the cross-sectional width of the other inside ribs. Due to the increased width of the additional rib, a tight sealing between the boot and the joint casing in the region of a first side wall of the first side region of the annular groove is obtainable. In yet another alternative arrangement, the features of the boot concerning the additional rib may be combined in each way with each other. Thus, the boot may have an additional rib with some recesses forming rib elements, the rib elements having a cross-sectional width which is at least 30 percent greater than the cross-sectional width of the other inside ribs.

The additional rib may be separated from the neighboring inside ribs by a groove. The groove may have the same dimensions for the depth D as the grooves between the neighboring circumferential inside ribs being assigned to a region on an outside of the first attachment region providing the binder seat region for the binder element. The grooves separating the additional rib from the neighboring circumferential inside ribs as well as separating the neighboring circumferential inside ribs from each other, and in one exemplary arrangement, have the same depth, however, the depth of said grooves may also deviate from each other wherein the depth of said grooves as well as the groove between the additional rib and the neighboring circumferential inside rib may be in a range from about 0.01 mm to 0.25 mm.

In a further exemplary embodiment, the additional rib is assigned to the binder seat region in part. Thus, at least another part of the additional rib will not be located under a mounted binder element, and, thus, providing for enough flexibility to achieve a tight sealing between the boot and the joint casing in the region of a first side wall of the annular groove. In another, alternative embodiment, the additional rib is not assigned, also not in part, to the binder seat region.

In one exemplary arrangement, boots described herein may be used for constant velocity joints and may be designed as convoluted boots having a plurality of folds in the fold region, as well as for roll boots having only one fold in the fold region. Such boots amounted on joint casings by way of a binder element, also called tensioning element, being also used to fix said boots on a shaft in a second attachment region being opposite arranged from the first attachment region in a boot in accordance with one exemplary arrangement. Such boots are usually made of a thermoplastic elastomere material or mixtures of thermoelastic elastomere materials, for example based on polyurethane (TPU), polyamide (TPA), polyolefines (TPO), polyester (TPEE) or a thermoplastic elastomere vulcanizate (TPV), or a thermoplastic poly-ether-ester-elastomere (TEEE). The material or mixtures of materials of the boots disclosed herein may be made of or may further comprise other materials, especially additives like diffusion-promoting add mixtures or any other additives a person skilled in the art will be aware of in view of the use of the boots in question, especially in view of the demands of automotive industry if the boots are used for automotives. However, the boots disclosed herein may also be made of usual rubber-elastic materials.

The binder element disclosed herein may be fixed on a joint casing by way of each kind of fasteners known from the prior art, such as clamping elements, especially clamping straps, but also clamp or compression rings. Said fasteners exhibit clamping and/or compression forces on the binder seat region of the boot.

The binder element may also have a defined and limited operation way for closing, thus the binder element may only be fastened for a certain, well-defined degree, providing for a good tensioning between the boot, and especially between the outside ribs and the binder element. The outside ribs may serve as spring elements when a binder element is mounted.

In another exemplary embodiment, the ring element is interrupted by at least one arrangement mechanism arranged on the outside of the first side region of the attachment region. The ring element, however, in another embodiment may be arranged without any interruption on the outside of the attachment region in the first side region of the same and assigned to the additional rib. The orientating side surface for the binder element may be provided for by a vertical side wall. In a cross-sectional view, the ring element may have a rectangular or trapezoidal shape, however, also other possible cross-sectional shapes may be used. In another examplary arrangement, opposite the orientating side surface another side surface is provided for by the ring element terminating, in one embodiment, in an even way so that the surface orientated to the first side wall of the annular groove of especially a joint casing does not show any irregularities.

In another embodiment, the annular groove of a joint casing or a shaft is generally filled by the base or by circumferential rib or ribs, and, if present, the additional circumferential rib. "Generally filled" in the sense of the this disclosure means that in a cross-sectional view in the direction of the main axis of the boot as well as the main axis of a joint casing corresponding to the main axis of the boot, the annular groove is filled with material of the attachment region, and, is especially in contact with the first and second side wall of the annular groove. Generally filled in the sense of the present disclosure, however, does not mean that the annular groove is form-fitted by the base or the circumferential inside rib or ribs, and, if present, the additional circumferential rib, but that also some unfilled room may exist, all of the aforesaid referred to an unfixed state of the boot on a joint casing or a shaft.

In a further representative embodiment, at least one of the circumferential inside ribs and the additional rib have a cross-sectional curved shape, viewed in a direction of the main axis of the boot. In another configuration, all of the circumferential inside ribs have a cross-sectional curved shape. One may address the at least one circumferential inside rib and the additional rib having a cross-sectional curved shape as annular beads.

In another embodiment, a circumferential inside rib is arranged for on an inside of the attachment region and has a cross-sectional composed shape comprising, viewed in a direction of a main axis of the boot, a sloping section, a middle section and a curved section. In one arrangement, only one such circumferential inside rib having said cross-sectional composed shape is provided, although at least one such circumferential inside rib having said cross-sectional composed shape may be provided in addition.

It may be provided advantageously that the sloping section starts at the level of the bottom line and slopes straightly towards the fold region and the main axis of the boot until it smoothly fades to the middle section, that the middle section extends towards the fold region and abuts on the curved section, and that the curved section turns upwardly away from the main axis towards the bottom line until it smoothly fades to the bottom of the base. The middle section may be formed as desired according to requirements, and it may, as one advantageous example, be straight and in parallel with the bottom line, or it may, as another advantageous example, be concavely formed with respect to the bottom line.

It may be provided that the circumferential inside rib having said cross-sectional composed shape is assigned at least in part to at least two circumferential outside ribs. In case of at least four circumferential outside ribs, the circumferential inside rib having said cross-sectional composed shape may not be assigned to the two outermost circumferential outside ribs, i.e. the one closest to the fold region and the one farthest from the fold region.

The circumferential outside ribs may have a rectangular or trapezoidal cross-section, viewed in a direction of the main axis of the boot. The cross-sectional shape of the circumferential outside ribs may be generally the same, however, may also deviate from each other. Further, the cross-sectional shape of the circumferential outside ribs may also be designed in any other possible way. Further, in yet another embodiment, the cross-sectional width and the cross-sectional height of the circumferential outside ribs is the same, however, the cross-sectional width, but also the cross-sectional height may also deviate from each other, for example the cross-sectional height may be greater than the cross-sectional width. The circumferential outside ribs may be addressed as having a bar-like embodiment, compared to the circumferential inside rib or ribs and the additional rib that may be addressed as having a cross-sectional curved shape as annular beads.

The cross-sectional width and the cross-sectional depth of outside slits may be generally the same, however, especially if only one or two circumferential inside ribs were present, especially the cross-sectional depth of the slits may deviate from each other in said embodiment, the slits assigned to the only one or two circumferential inside rib or ribs being arranged on the bottom of the base show a greater depths than the other slits.

The circumferential inside rib or ribs and the additional rib may have different inner diameters $D1$ and $D2$. Especially if at least two circumferential inside ribs were present, the same may have a different inner diameter $D1$ and $D2$. In one exemplary arrangement, if different inner diameters were present, only one circumferential inside rib may have a larger inner diameter $D1$ or $D2$ compared to other circumferential inside ribs that may be present. Only said circumferential inside rib having the larger inner diameter may engage in an annular groove of a joint casing or a shaft.

The attachment region, thus, comprises the base supporting at least two circumferential outside ribs, and, if present, at least one circumferential inside rib and/or an additional (inside) rib. Further, the attachment region comprises a ring element and probably an arrangement mechanism in the first side region of the attachment region, and in the second side region of the attachment region being located near the fold region of the boot a transition element providing for the orientating side surface for a binder element. The attachment region further comprises a binder seat surface being located above the base outside surface directed to the outside of the attachment region. Between the at least two circumferential outside ribs being embodied in a bar-like form, a slit is defined. In one exemplary arrangement, the dimensions of the slit between circumferential outside ribs is identical to the cross-sectional shape dimensions of the circumferential outside ribs, with the exception of the slits being located near the orientating side surface of the first side region and the orientating side wall of the second side region of the attachment region. Circumferential inside ribs and/or the additional (inside) rib may be separated from each other by a groove.

A first arrangement mechanism may be arranged in the first side region of the attachment region, preferably in pairs being opposite to each other. For example, eight arrangement mechanisms, thus, leading to four pairs of the arrangement mechanism, may be arranged on the first side region on the outside of the attachment region. Similarly, on the outside of the attachment region in the second side region beneath the fold region of the boot, a second arrangement mechanism may be arranged. In one arrangement, the second arrangement mechanism is arranged opposite first arrangement mechanism, so that a pair of the first arrangement mechanism and the second arrangement mechanism is created. The second attachment mechanism may have another shape than the first attachment mechanism. In one exemplary arrangement, both the first and second arrangement mechanisms provide for orientating surfaces for the binder element, thus defining also the binder seat region. The binder element may with its side walls be in contact with the first and/or second arrangement mechanism, however, this must not necessarily happen, because the binder seat region shows a greater width than the binder seat surface.

A system comprising a boot as described above and in the following and a joint casing is disclosed. In another embodiment, at least one binder element is included in the system.

Other advantages and features of the disclosure will become apparent to one of skill in the art reading the following detailed description with reference to the drawings illustrating features of the disclosure by way of example.

BRIEF DESCRIPTION OF THE DRAWINGS

For more complete understanding of this disclosure, reference should now be made to the embodiments illustrated in greater detail in the companion drawings and described below by way of examples.

In the drawings.

DETAILED DESCRIPTION

While the present disclosure is described with respect to a boot, the present disclosure may be adapted and utilized for other fixable sealing applications mating with a circumferential surface of a stretchable part, including such applications outside of the constant velocity joint art. Especially, the boot in accordance with the various embodiments disclosed herein, may be a roll boot or a convoluted boot. However, also any other machinery form parts may be protected by the boot in accordance with the present disclosure. Generally, but not specifically, the boot usually shows two attachment regions. If the boot is designed to be fixed on a shaft and a joint casing, the first attachment region is assigned to the joint casing whereas the second attachment region is assigned to the shaft.

In the following detailed description, special orienting terms are used such as "left", "right", "outside", "inside", "beneath", "next to", "underneath", and the like. It has to be understood that these terms are used for convenience of description of the components or embodiments by reference to the drawings. These terms do not necessarily describe the absolute location in space, such as upward, downward, left, right etc. that any part must assume. Further, in the following description, various operating and numerical parameters and components are described for several constructed embodiments. These specific parameters and components are included as examples and are not meant to be limiting.

In the context of the present disclosure, the phrase "assigned to" means that circumferential inside, outside and/or additional ribs and/or slits, respectively, are arranged on the outside or the inside, respectively, of the first or second attachment region at least in part in similar regions in a cross-sectional view in the direction of the main axis of the boot. Especially, the outside slits must not be arranged within the width of the rib element or the ribs, but may also only partially be arranged in a region corresponding to the width as defined by a rib or a rib element. However, in one exemplary embodiment, the circumferential slits are arranged generally centered within the width of a circumferential inside rib.

In the context of the present disclosure, the term "cross-sectional width", "cross-sectional plane", or "cross-sectional height" is to be understood as follows: The cross-sectional width refers to a cross-sectional view of the embodiment in question in accordance with the present disclosure, and especially refers to the outside ribs and the base. Said cross-sectional view is obtained when viewing in a direction of the main axis of the embodiment being described, that is the main axis 62 as may be taken from FIG. 1.

In the context of the present disclosure, the term "cross-sectional depth" is to be understood as follows: The term "cross-sectional depth" used throughout the present disclosure refers to the outside slits being arranged between circumferential outside ribs. The cross-sectional depth is measured from a base surface 64 up to a binder seat surface 38 defined by a line 39 in FIG. 2 of the present disclosure.

In the context of the present disclosure, the term "orientating" used in connection with side surfaces or walls especially of the ring element or the second side region of the attachment region is to be understood as follows: The binder element in no way must be in direct contact, neither in total, nor in part, with the orientating surface, however may be in contact with the same. The orientating surface or walls provides for a helping means for the mounting of the binder element, that also holds for first and/or second arrangement mechanism.

In the context of the present disclosure, the term "thickness" T as used in connection with the binder seat region of the attachment region is to be understood as follows: The thickness is measured between the surface of the binder seat region shown as line 39 in FIG. 2 and the maximum outer shape of the circumferential ribs and/or the additional rib as defined, for example, by line 57 in FIG. 2, or, if such inside ribs were not present, by the bottom of the base as defined by line 56 in FIG. 6. If, that is preferred, a line connecting the peeks of the circumferential inside ribs and/or the additional rib is generally parallel to the binder seat region plane (line 58), the thickness T is measured between the plain of the binder seat region and said virtual line.

In the context of the present disclosure, the term "depth" D as used in connection with the grooves between neighboring circumferential inside ribs as well as the groove between the additional rib and the neighboring circumferential inside rib is to be understood as follows: The depth D is measured between the maximum outer shape of the circumferential inside ribs and/or the additional rib as defined, for example, by line 57 in FIG. 2, of an unmounted boot. At least two neighboring circumferential inside ribs and/or the additional rib should be connected by said line 57. If a line connecting the peaks of the circumferential inside ribs and the additional rib is generally parallel to the binder seat region plain (as is line 57 in FIG. 2), the depth D is measured between said virtual line as well as a bottom line (see line 56 in FIG. 2) connecting at least two neighboring grooves being arranged between circumferential ribs and/or the additional rib. In one arrangement, a bottom line (see line 56 in FIG. 2) connecting the ground of all grooves between the circumferential inside ribs and the additional rib is generally parallel to the binder seat region plain (defined by line 39). In such an arrangement, the bottom line, as well as the line connecting the peaks of the circumferential inside ribs and the additional rib, are generally parallel to the main axis of the boot.

In the context of the present disclosure, the term "height" H1 and H2 as used in connection with the at least two circumferential outside ribs as well as the height (or thickness) of the base is to be understood as follows: The term "height H1" used throughout the present disclosure refers to the distance between line 31 also defining the base surface 64 of the base 33 and the line 39 defining the binder seat surface 38. Said distance defines height H1 of the at least two circumferential outside ribs. In contrast thereto, the term "height H2" of the base is defined by the distance between said line 31 as well as line 56 already mentioned above and viewed in FIG. 2.

Figure 10:
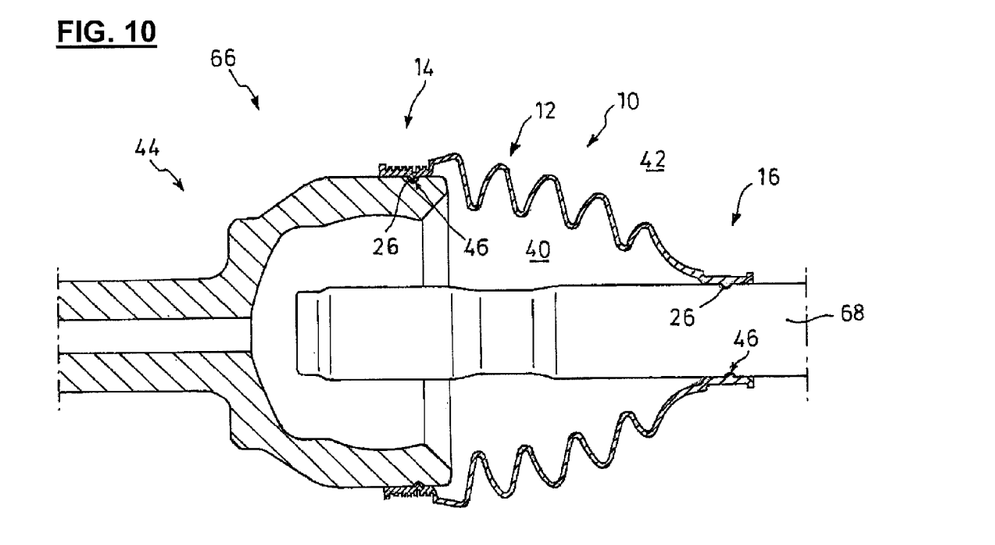
FIG. 10 is a cross-sectional view of the system of the fifth embodiment in accordance with FIG. 9, where the cross-section is made in an area between, if present, arrangement mechanisms, and in direction of the main axis of the boot and the joint casing.

In the context of the present disclosure, the term "inner diameter" D1 and D2 are used in connection with embodiments of the present disclosure showing more than one circumferential inside rib is to be understood as follows: The inner diameter D1 and the inner diameter D2 of two inside ribs are measured with respect to the whole boot in the attachment region in a cross-sectional view in direction of the main axis, and were defined as shown in FIG. 10 with respect to an inner diameter D1. When viewed in a cross-sectional view, inner diameter D1 referring to one circumferential inside rib or ribs is defined and measured between the maximum of the peak region of said circumferential inside rib or ribs on two points lying opposite to each other on the inside of the boot, whereas the inner diameter D2 referring to another circumferential inside rib or ribs is measured and defined by the maximum of the peak region of said another circumferential inside rib or ribs on two points lying opposite to each other on the inside of the boot.

Figure 2:
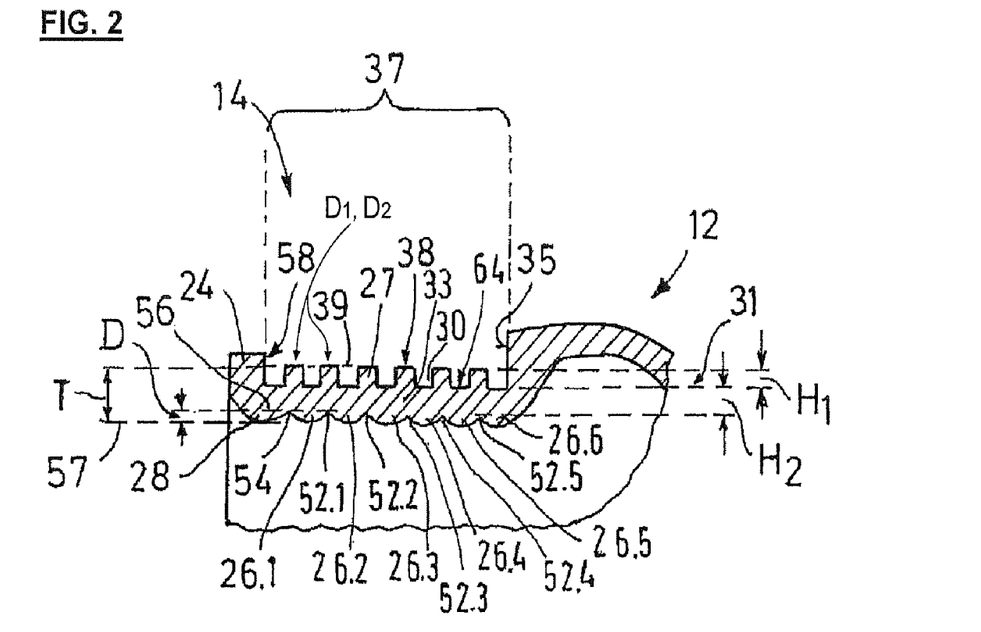
FIG. 2 is a partial cross-sectional view through a first attachment region of the first embodiment in accordance with FIG. 1, where the cross-section is made in an area between arrangement mechanisms and in a direction of a main axis of the boot.

In the context of the present disclosure, the phrase "rectangular" means that in a cross-sectional view the circumferential outside ribs and slit or slits have a rectangular contour, whereby the open side of the slits may be defined by line 39 in FIG. 2 defining the binder seat region. The cross-section of the circumferential outside ribs and/or slits may also have a quadratic contour, being within the definition of the term "rectangular" in the sense of the present disclosure.

The boot may be manufactured of a thermoplastic elastomer material or any other kind of elastomer material, especially a rubber elastomer material, or mixtures thereof. Advantages are provided by thermoplastic elastomer materials. These include materials known from the prior art that has two different polymer segments, namely a relatively rigid resin segment and an elastic soft segment. The individual polymer segments are comprised of longer chains of similar monomers. The resin segments hold the soft segments together by physical, network-like bonds. A thermoplastic elastomer material for manufacturing boots in accordance with the present disclosure is the thermoplastic material marked under the brand name "Hytrel" manufactured by the DuPont company.

In another aspect of the disclosure, the first and/or a second attachment region of the boot is at least partially manufactured of an elastomer material. In contrast to thermoplastic elastomer materials, an elastomer material has the advantage of having a reduced so-called "cold flow" then situated underneath the fastening element. This cold flow is understood to be the phenomenon in which, when subjected to clamping or compression stress, the plastic material in the first, but also in the second attachment region "escapes" literally from the fastener, as a result of which the boot can come loose during operation, particularly when under thermal stress. Other regions of the first and/or second attachment region can nevertheless be manufactured of a thermoplastic elastomer material. The same advantage can also be achieved if a layer of the thermoplastic elastomer material is placed underneath the elastomer material. Possible elastomer materials include for example polyurethane rubber, polyester-based polyurethane/rubber mixtures or polychloroprenes.

The first attachment region of the boot is advantageously at least partially comprised of a layer of a thermoplastic elastomer material or a layer of an elastomer material. To a great extent, this avoids the known disadvantages of using thermoplastic elastomer materials in the clamping region of the collar. It is also possible for the layer, which is comprised of an elastomer material, to be integrally joined in a permanent fashion to the fastening mechanism.

As an exemplary method according to the disclosure can be carried out in the form of a pressblower injection blow molding process, however, may also be produced with an injection/extrusion process, an injection molding process, an injection/pressing process and/or an extrusion/blow molding process. The pressblower injection blow molding process and the injection/extrusion process are advantageously used, because precisely-dimensioned boots may be produced by said processes.

Figure 1:
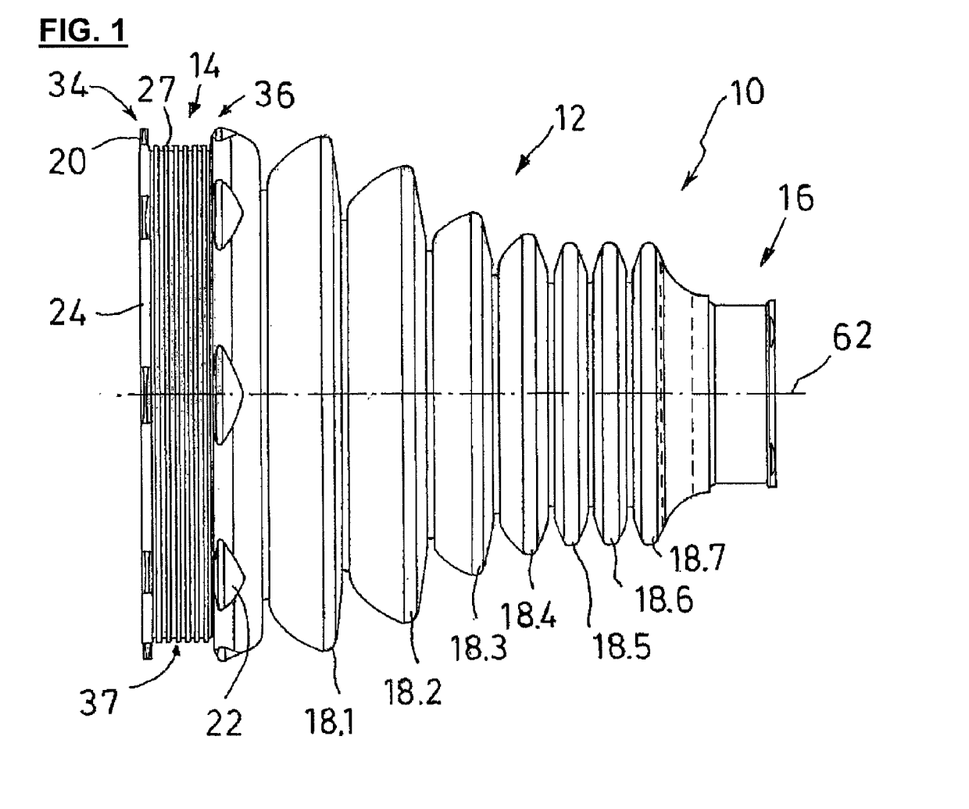
FIG. 1 is a side view of a first exemplary embodiment of the present disclosure in the form of a convoluted boot for constant velocity joints.

Referring now to the drawings where alike reference numerals are used to identify identical components in the various views, FIG. 1 illustrates a sight view of a first embodiment in the form of a convoluted boot 10. The convoluted boot 10 comprises a fold region 12 with seven folds 18.1 to 18.7, as well as a first attachment region 14 for mounting said boot 10 on a joint casing (not shown) as well as a second attachment region 16 for mounting the boot 10 on a shaft (not shown). Through the boot 10 a main axis 62 is defined. The first attachment region 14 comprises a first side region 34 and a second side region 36 being arranged opposite to each other, whereby the second side region 36 is arranged beneath the fold region 12, whereas the first side region 34 is arranged opposite to the second side region 36. The first side region 34 comprises eight first arrangement mechanisms 20, whereas the second side region 36 comprises eight second arrangement mechanisms 22, the first and the second arrangement mechanisms 34, 36 are arranged opposite each other in pairs. Further, the first side region 34 comprises a ring element 24.

Now turning to FIG. 2 being a partial cross-sectional view through the first attachment region 14 of the first embodiment according to FIG. 1, where the cross-section is made between two first arrangement mechanisms 20, one may clearly see that the first attachment region 14 comprises a first binder seat region 37 with a surface being defined by line 39 on which a binder element (not shown) may be mounted. The part of the binder seat region 37 that is underneath the mounted binder element defines a binder seat surface 38. The first attachment region 14 further comprises on an outside 42 six circumferential outside ribs 27.1 to 27.6 (please also refer to FIG. 4) having a cross-sectional height and width that is generally the same. On the inside 40, six circumferential ribs 26.1 to 26.6 having a cross-sectional curved shape are arranged for on a bottom of a base 33. The circumferential ribs 26.1 to 26.6 are separated from each other by grooves 52.1 to 52.5, having a depth D of around 0.1 mm. Further, an additional rib 28 embodied as rib elements (see FIG. 5) is arranged on the inside 40 of the first attachment region 14 in the first side region 34 (see FIG. 1), also having a cross-sectional curved shape, however, the width of said additional rib 28 is around 50% greater than the width of the other circumferential ribs 26.1 to 26.6, when measured with respect to the bottom line 56. Between said additional rib 28 and a neighboring circumferential rib 26.1 a groove 54 is arranged having also a depth D of around 0.1 mm.

Further, assigned to the additional rib or rib element 28 is the ring element 24 in the first side region 34 of the first attachment region 14 having a more or less rectangular cross-sectional shape, and providing for an orientating side surface 58 for a binder element not shown. Said side surface 58 defines one boundary for the binder seat region 37, the other boundary is defined by an orientating side wall 35 in the second side region 36 that may be provided by second attachment mechanism 22.

The cross-sectional height H1 of the outside ribs 27 is about 35 percent of the thickness T of the binder seat region 37 defined between lines 39 and 57, and about 40 percent of the height H2 corresponding to the thickness of the base 33. The depth D of the grooves 52 and/or 54 is measured between bottom line 56 and line 57. Line 57 is defined by the maximum peaks of each of the circumferential ribs 26 and/or additional rib 28 and is parallel to the main axis 62 of the boot 10, as is the case with line 56, because all ribs 26.1 to 26.6 and 28 have an identical height. Line 56 is defined by the grooves 52 and/or 54, thus defining the bottom of the ribs 26 and/or 28.

The base 33 supports the sixth circumferential outside ribs 27.1 to 27.6 on its base surface 64. The cross-sectional planes of all of the ribs 27.1 to 27.6 is smaller than the cross-sectional plane of the base 33.

Figure 3:
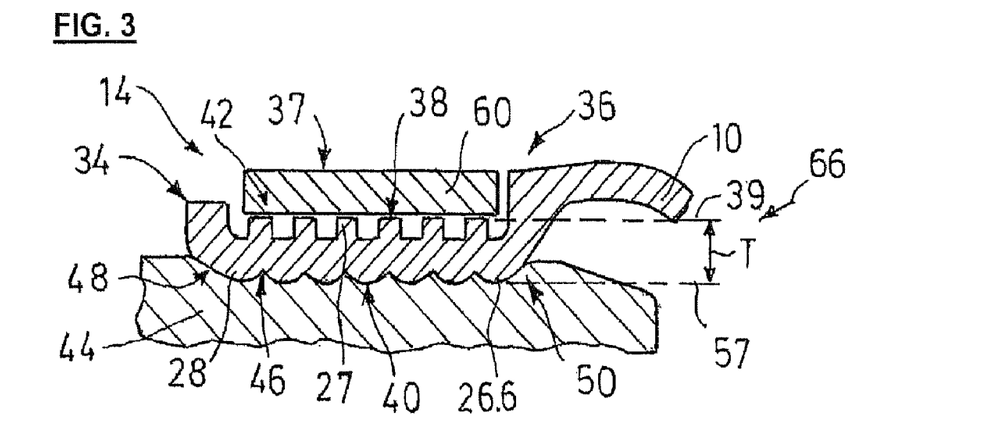
FIG. 3 is a partial cross-sectional view of the first attachment region of a second embodiment in the form of a system comprising a boot, such as a convoluted boot for constant velocity joints, where the cross-section is made in an area between arrangement mechanism and in a direction of a main axis of the boot.

FIG. 3 shows a second embodiment of the present disclosure, namely a system 66 where a boot 10 is mounted on a joint casing 44 by way of a clamping strap 60 as a binder element. In said second embodiment, one may easily derive that the additional rib 28 only in part contributes to the binder seat region 37, and is in contact with a first side wall 48 of an annular groove 46 on the outside of the joint casing 44. Further, a circumferential rib 26.6 is in contact with a second side wall 50 of the annular groove 46 and is arranged in the second side region 36 of the first attachment region 14. All of the peaks of the rib element 28 and the inside ribs 26 are in contact with the ground of the annular groove 46, thus generally filling the annular groove 46, and a tight sealing especially between the boot 10 and the joint casing 44 in the region of the first side wall 48, but also the second side wall 50 is obtained.

Figure 4:
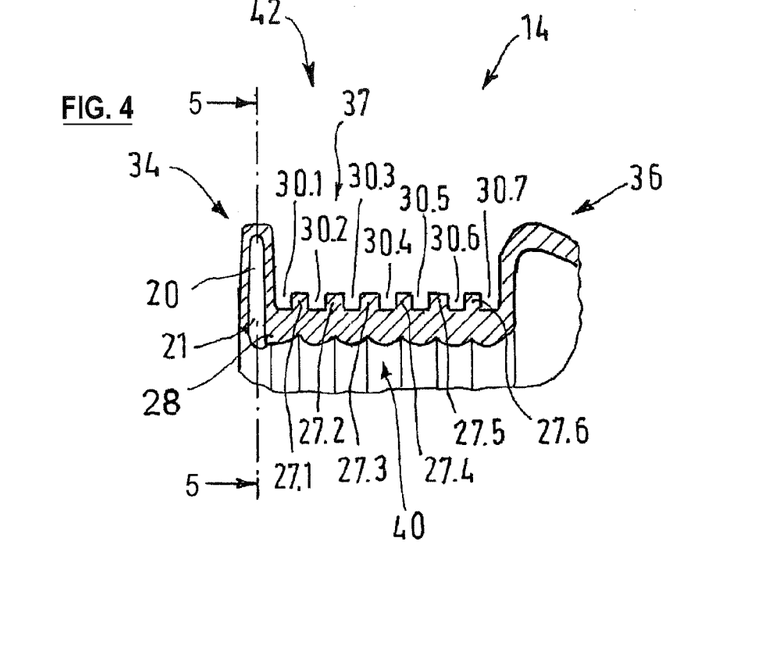
FIG. 4 is a partial cross-sectional view of the first attachment region of the first embodiment shown in FIG. 1, where the cross-section is made through an arrangement mechanism and in a direction of a main axis of the boot.

Turning now to FIG. 4, a cross-sectional view for the first attachment region 14 of the first embodiment is shown. The difference to the cross-sectional view of FIG. 2 is that here the cross-section is made through an arrangement mechanism 20, as may be taken from FIG. 1. One may derive from FIG. 4 the binder seat region 37 with seven slits 30.1 to 30.7 having an essentially equal cross-sectional width and cross-sectional depth. The slits 30.1 and 30.7 close to the first side region 34 and the second side region 36 show a slightly different contour on the bottom in that the transition from the first side region 34 and the second side region 36 to the bottom of said slits 30.1 and 30.7 shows a slightly curved contour, whereas the bottoms of the other slits 30.2 to 30.6 are essentially flat without any curved transition to the circumferential outside ribs 27.1 to 27.6. Slit 30.1 is in contrast to the slits 30.2 to 30.7 assigned to the additional rib element 28 not in a centered way, but is slightly set off towards the second side region 36, whereas the other slits 30.2 to 30.7 are essentially assigned in a centered way to the circumferential inside ribs 26.1 to 26.6. Said embodiment may also be taken from FIG. 2.

Further, assigned to the additional rib 28 and arranged on the outside 42 in the first side region 14 is one arrangement mechanism 20. Said arrangement mechanism 20 comprises a slit 21 extending from the inside 40 to the outside 42 of the first attachment region 14, where said slit 21 shows an opening to the inside 40 of the first attachment region 14. However, in another embodiment of the present disclosure, said slit 21 may be omitted, or may have another possible shape.

Figure 5:
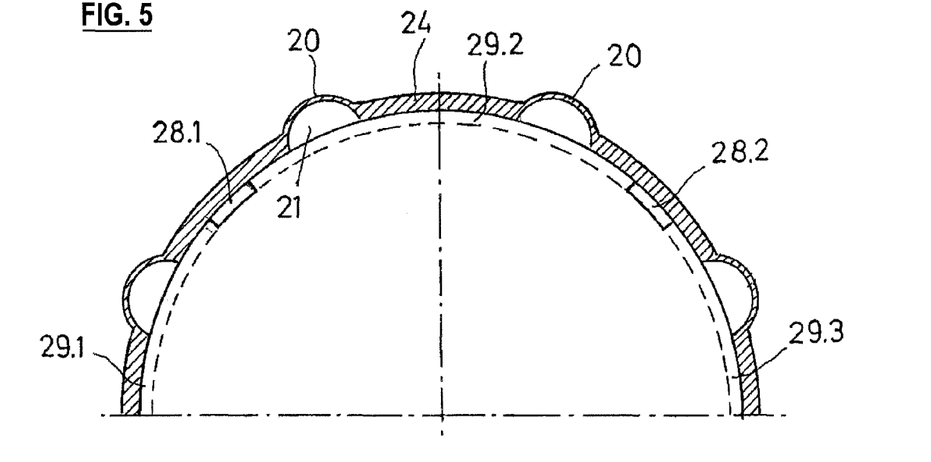
FIG. 5 is a partial cross-sectional view perpendicular to the main axis of the boot and along line A-A of FIG. 4 of the first embodiment.

FIG. 5 shows a cross-sectional view along line A-A of FIG. 4. One may derive that the slit 21 being located within the first arrangement mechanism 20 has a curved shape with respect to its bottom, and that by the arrangement mechanism 20 the ring element 24 is interrupted. Further, the ring element 24 provides for a material massing of the first side region 34 of the first attachment region 14 of the boot 10. The additional rib 28 may be embodied as rib elements 28.1 and 28.2 interrupted by recesses 29.1 to 29.3.

Figure 6:
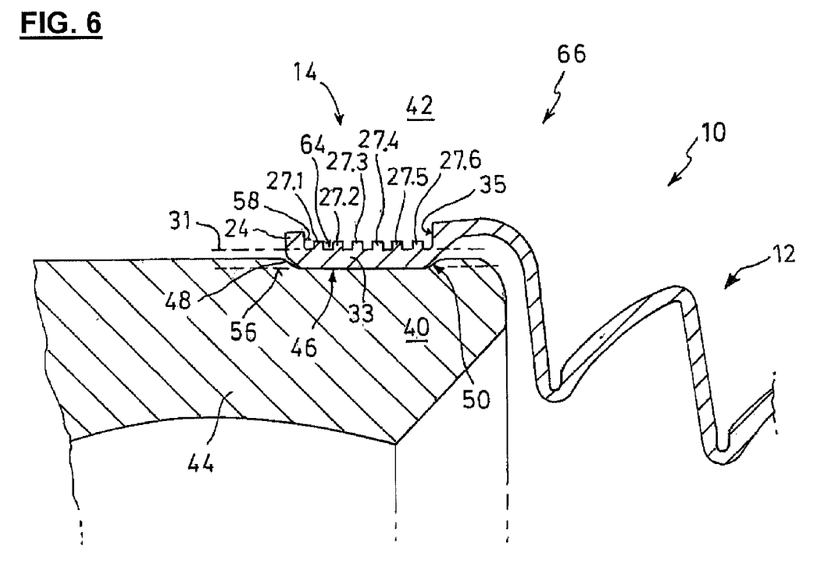
FIG. 6 is a partial cross-sectional view of a first attachment region of a third embodiment in the form of a system comprising a boot, such as a convoluted boot for constant velocity joints, and a joint casing, where the cross-section is made in an area between, if present, arrangement mechanisms, and in a direction of the main axis of the boot.

FIG. 6 shows a third embodiment of the present disclosure. FIG. 6 is a partial cross-sectional view through a system 66 of the third embodiment comprising a boot 10 and a joint casing 44, the boot having a fold region 12 and a first attachment region 14. The first attachment region 14 of said third embodiment of the present disclosure largely resembles the attachment regions of the first and second embodiments, however, on the inside 40 of the first attachment region 14, no circumferential inside ribs or additional circumferential inside ribs are arranged for. An annular groove 46 of the joint casing 44 is generally filled by a base 33 between a first side wall 48 and a second side wall 50 of the annular groove 46. On a base surface 64 of the base 33, six circumferential outside ribs 27.1 to 27.6 are arranged for, thus providing for a binder seat surface.

Figure 7:
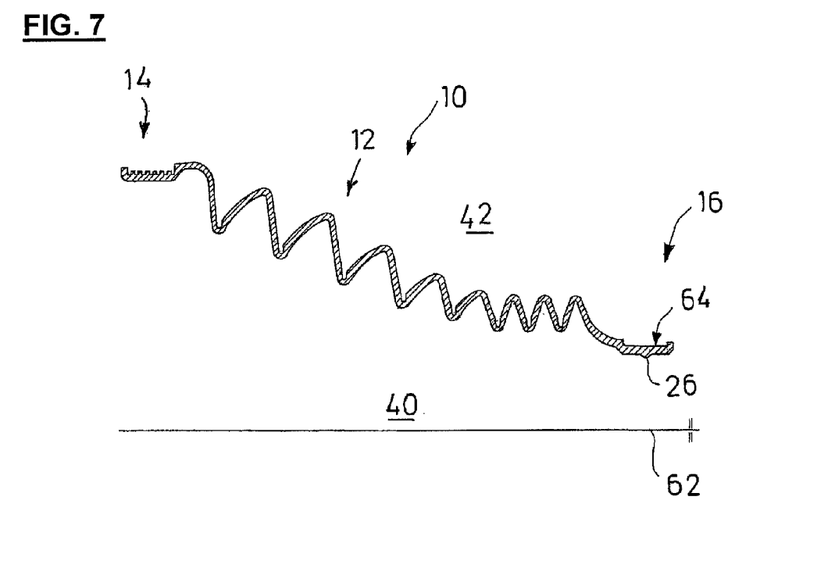
FIG. 7 is a partial cross-sectional view through the first and second attachment region and a fold region of a boot in accordance with the third embodiment of FIG. 6.

FIG. 7 is a partial sectional view through the boot 10 in accordance with the third embodiment of the present disclosure. In addition to the first attachment region 14, also the second attachment region 16 is shown, however, the first attachment region 14 and the second attachment region 16 are embodied in a different way in that the second attachment region 16 shows no circumferential outside ribs being arranged for on the base surface 64, whereas on the inside 40 only one circumferential inside rib 26 is located nearly in the middle of the binder seat region of the second attachment region 16.

Figure 8:
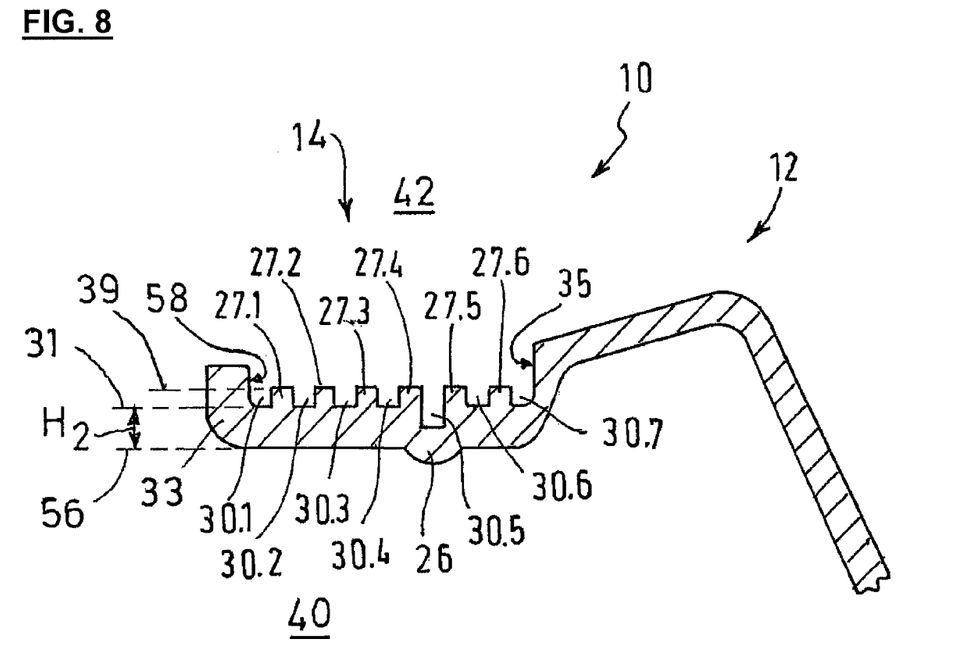
FIG. 8 is a partial cross-sectional view through a first attachment region of a forth embodiment in the form of a convoluted boot for constant velocity joints.

FIG. 8 shows a fourth embodiment of the present disclosure, namely a boot 10 with a fold region 12 and a first attachment region 14 in a partial cross-sectional view. The only difference between said fourth embodiment and the third embodiment is that on the inside 40 of the first attachment region 14 on the bottom of a base 33 defined by line 56 one circumferential inside rib 26 is arranged for having a cross-sectional curved shape. Assigned to said circumferential inside rib is a slit 30.5 located between circumferential outside ribs 27.4 and 27.5 having a greater cross-sectional depth than the other outside slits 30.1 to 30.4 and 30.6 to 30.7. However, the height H2 of the base 33 is nevertheless defined by line 31 and 56 as may be derived from FIG. 8. As is also the case in the first to third embodiment, also in the fourth embodiment the cross-sectional plain of all of the circumferential outside ribs 27.1 to 27.6 is smaller than the cross-sectional plain of the base 33. The cross-sectional width and the cross-sectional height of the circumferential outside ribs 27.1 to 27.6 is identical so that a quadratic cross-sectional embodiment providing for a bar-like contour is achieved. Again, outside slits 30.1 and 30.7 deviate in the cross-sectional contour from the contour of outside slits 30.2 to 30.6, as was already described with respect to the first embodiment in FIG. 4 above.

Figure 9:
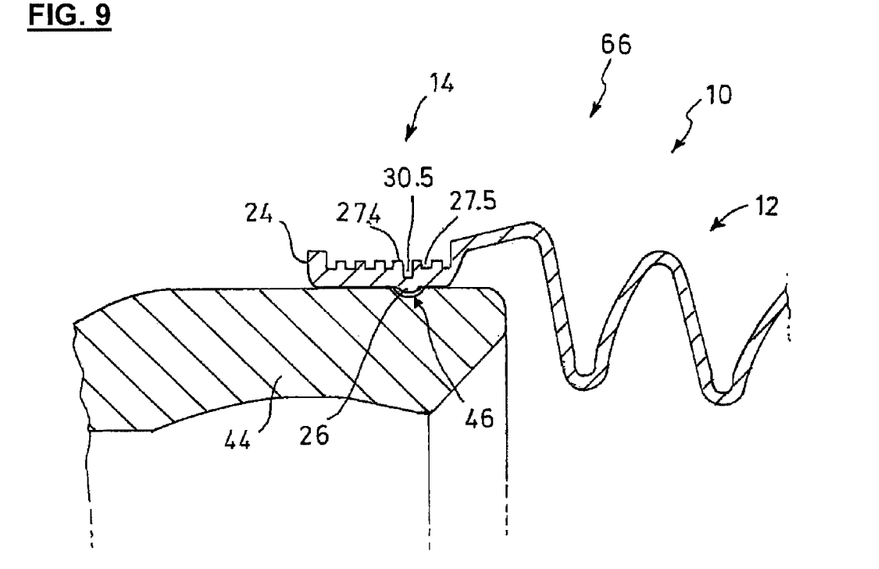
FIG. 9 is a partial cross-sectional view of the first attachment region of a fifth embodiment in the form of a system comprising a boot, such as a convoluted boot for constant velocity joints, arranged on a joint casing, where the cross-section is made in an area, if present, between arrangement mechanisms, and in a direction of the main axis of the boot, as is also the case for FIG. 8.

FIG. 9 shows the boot 10 in accordance with the fourth embodiment of FIG. 8 mounted on a joint casing 44, thus forming a system 66 being a fifth embodiment of the disclosure. One may especially derive from FIG. 9 that on the outside of the joint casing 44 an annular groove 46 is arranged for having a cross-sectional curved shape, that is generally filled by the circumferential inside rib 26.

FIG. 10 is a cross-sectional view through the system 66 of the fifth embodiment comprising the boot 10 and the joint casing 44 as well as a shaft 68. As is the case in the third embodiment, the first attachment region 14 and the second attachment region 16 differ in that the second attachment region 16 shows no circumferential outside ribs. However, also the second attachment region 16 shows on the inside 40 one circumferential inside rib 26 engaging in a correspondingly embodied annular groove 46 on the outer surface of the shaft 68.

Figure 11:
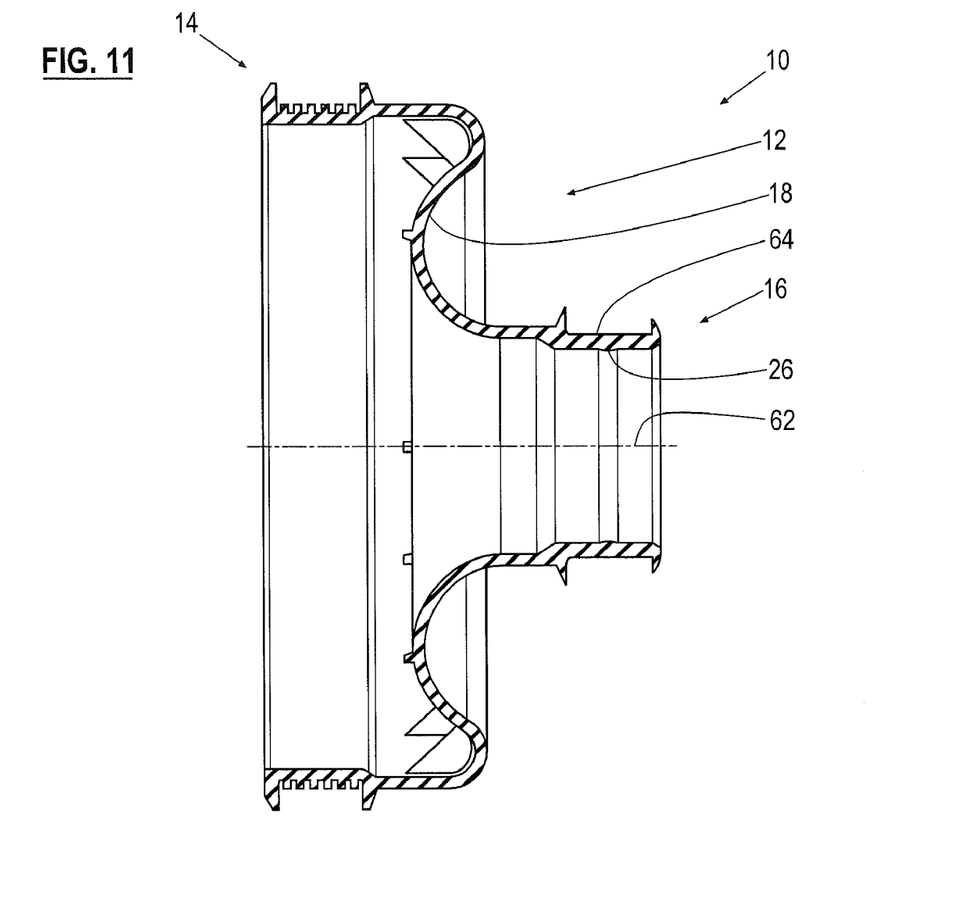
FIG. 11 is a cross-sectional view of a sixth embodiment in the form of a roll boot for constant velocity joints, where the cross-section is made in a direction of a main axis of the boot.
Figure 12:
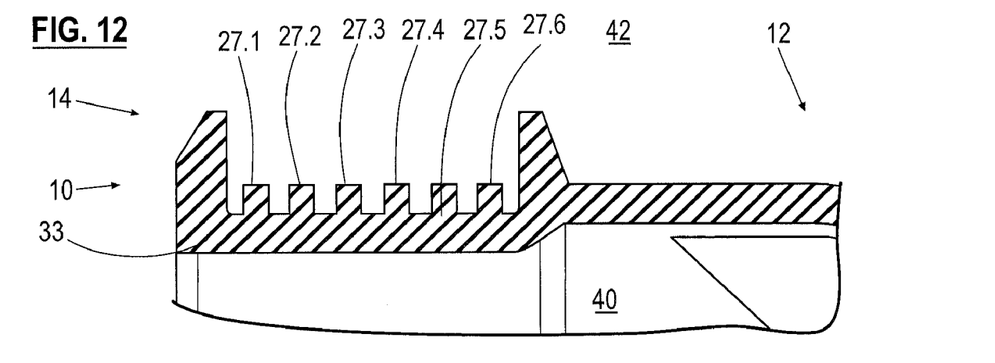
FIG. 12 is a partial cross-sectional view through a first attachment region of the sixth embodiment in accordance with [0043].

FIGS. 11 and 12 show a sixth embodiment of the present disclosure which resembles the third embodiment of FIGS. 6 and 7 so that in the following only the distinctions are described in more detail. The only main distinction is that according to the sixth embodiment, the boot 10 is a roll boot for constant velocity joints and the fold region 12 has only one fold 18.

Figure 13:
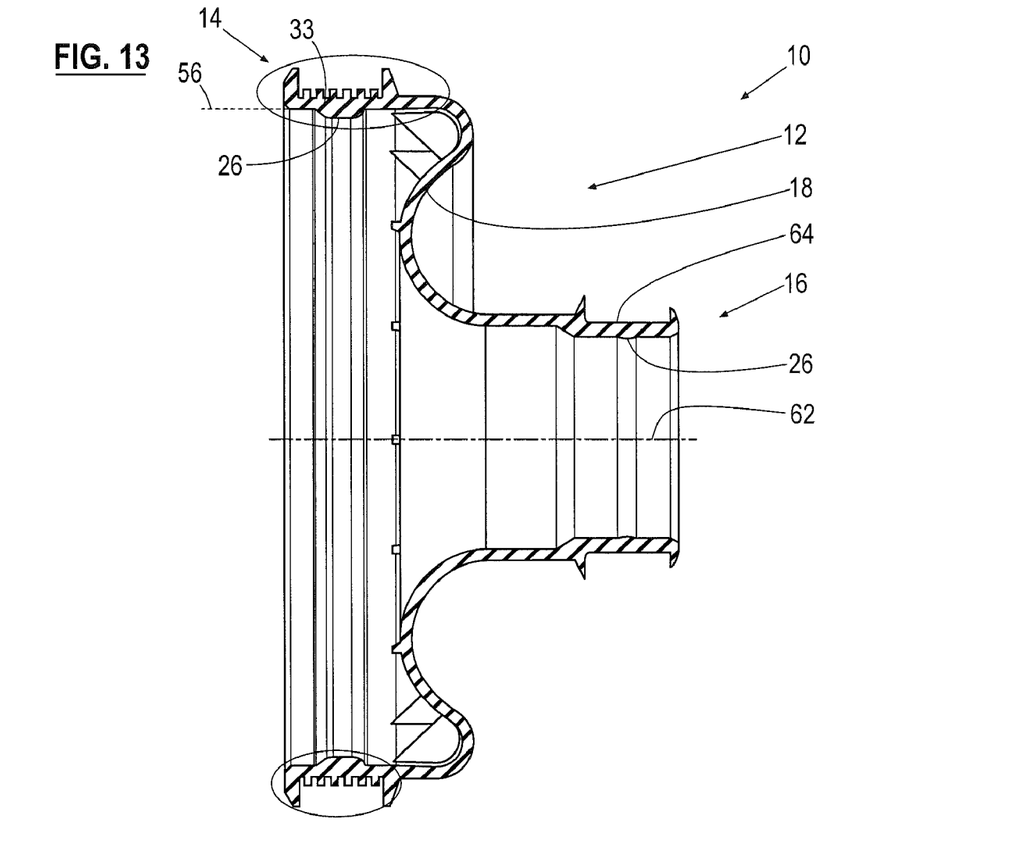
FIG. 13 is a cross-sectional view of a seventh embodiment in the form of a roll boot for constant velocity joints, where the cross-section is made in a direction of a main axis of the boot.
Figure 14:
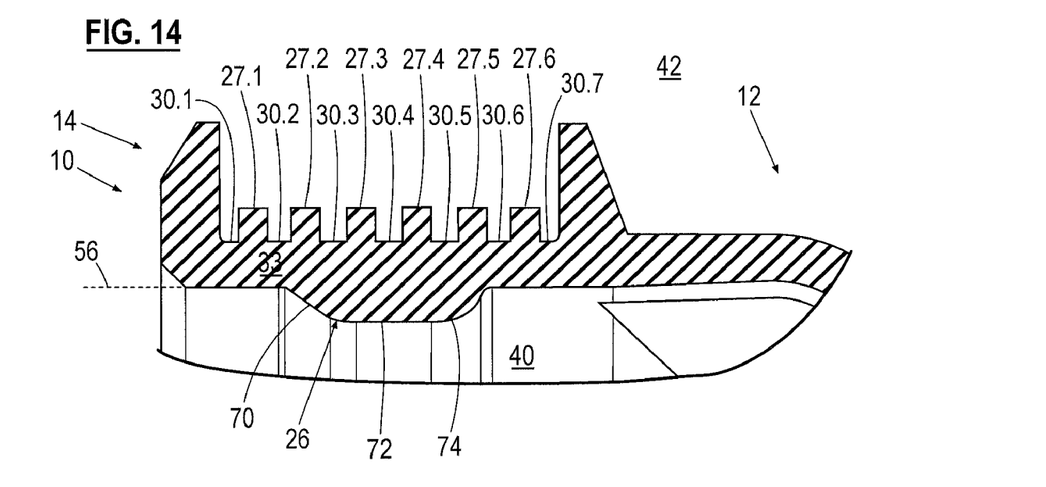
FIG. 14 is a partial cross-sectional view through a first attachment region of the seventh embodiment in accordance with [0045].

FIGS. 13 and 14 show a seventh embodiment which resembles the sixth embodiment of [0043] so that in the following only the distinctions are described in more detail. According to the seventh embodiment, the first attachment region 14 has one circumferential inside rib 26 arranged on the bottom of the base 33 defined by the bottom line 56. As may be taken from FIG. 14, this circumferential inside rib 26 has a cross-sectional composed shape that comprises, taken from left to right in FIG. 14, a sloping section 70, a middle section 72 and a curved section 74. The sloping section 70 starts at the level of the bottom line 56 and slopes straightly towards the fold region 12 and the main axis 62 of the boot 10 until it smoothly fades to the middle section 72. The middle section 72 extends towards the fold region 12 and abuts with its right end on the curved section 74. In this seventh embodiment, the middle section 72 is straight and in parallel with the bottom line 56. The curved section 74 turns upwardly away from the main axis 62 towards the bottom line 56 until it smoothly fades to the bottom of the base 33. The circumferential inside rib 26 is arranged underneath the outside slits 30.3 to 30.5, the circumferential outside ribs 27.2 to 27.4 and part of the circumferential outside rib 27.5. Thus, the circumferential inside rib 26 is assigned at least in part to at least two circumferential outside ribs 27, and further is not assigned to the two outermost circumferential outside ribs, i.e. the one 27.6 closest to the fold region 12 and the one 27.1 farthest from the fold region 12.

In the sense of the present disclosure, generally the circumferential outside ribs as especially shown in the first to seventh embodiment may also be interrupted by spaces, however, in order to provide for an equal flow of the pressure forces of a binder element to be mounted into the base for achieving a tight fixing and sealing, it is advantageous to embody the outside ribs with an equal cross-sectional height H1, thus providing for an equal and flat binder seat surface 38 in the binder seat region 37.

According to the first to seventh embodiment of the present disclosure, and in accordance with the general principle of the present disclosure, a binder seat surface is only provided for by the circumferential outside ribs, namely of the outer surfaces of the bar-liked designed circumferential outside ribs. The binder seat surface 38 being also defined by line 39 (see FIG. 2 and FIG. 8) lies above the base surface 64 of a base 33, so that pressure peaks may flow into the material of the base, and also into the circumferential inner ribs, if present, when clamping forces are exerted by a binder element when mounting the boot in accordance with the present disclosure, especially on a joint casing and/or a shaft in order to provide for a system in accordance with the present disclosure.

The present disclosure consequently creates a boot which permits a tighter sealing and, at least in part, also a simpler installation, particularly in the case of linkage components.

While the inventive boot has been described in connection with one or more embodiments, that disclosure is not meant to be limiting. Rather, the disclosure covers all alternatives, modifications and equivalents within the spiritual scope of the appended claims taking into account the description.

What is claimed is:
1. A boot, comprising:
   a fold region; and
   an attachment region, the attachment region comprising a binder seat region with a binder seat surface and an outside with at least three circumferential outside ribs extending from a base surface towards the outside, wherein the binder seat surface is provided for by the circumferential outside ribs; and wherein a cross-sec- tional width of the outside ribs and a cross-sectional height of the outside ribs is essentially the same.

2. The boot according to claim 1, wherein the at least two circumferential outside ribs have a first height ($H_1$) that is, at the most, equal or smaller than a second height ($H_2$) of a base of the attachment region.

3. The boot according to claim 1, wherein at least one circumferential rib is arranged for on an inside of the attachment region.

4. The boot according to claim 3, wherein at least one circumferential inside rib is assigned, at least in part, to at least two circumferential outside ribs.

5. The boot according to claim 3, further comprising an additional circumferential rib arranged on a first side region of the attachment region being opposite to the fold region on the inside of said attachment region, the additional rib having a cross-sectional width that is at least 30 percent greater than the cross-sectional width of the other at least one circumferential inside ribs.

6. The boot according to claim 3, wherein an annular groove of one of a joint casing or a shaft is generally filled by one of the base or the at least one circumferential inside rib or ribs.

7. The boot according to claim 1, wherein the area of the cross-sectional planes of all of the circumferential outside ribs is, at the most, equal to or smaller than the area of the cross-sectional plane of the base of the attachment region.

8. The boot according to claim 1, wherein at least two circumferential inside ribs are arranged for being separated from each other by way of a groove having a depth (D) of around 0.25 mm at the most.

9. The boot according to claim 1, wherein a depth (D) of a groove is in a region between about 0.04 mm to about 0.2 mm.

10. The boot according to claim 1, further comprising an additional circumferential rib arranged on a first side region of the attachment region being opposite to the fold region on the inside of said attachment region, the additional rib having at least two recesses to form at least two rib elements.

11. The boot according to claim 10, wherein the additional rib is assigned to the binder seat region at least in part.

12. The boot according to claim 1, wherein at least one of the at least one circumferential inside ribs has a cross-sectional curved shape, viewed in a direction of a main axis of the boot.

13. The boot according to claim 1, wherein a circumferential inside rib is arranged for on an inside of the attachment region and has a cross-sectional composed shape comprising, when viewed in a direction of a main axis of the boot, a sloping section, a middle section and a curved section.

14. The boot according to claim 13, wherein the at least one circumferential inside rib having said cross-sectional composed shape is assigned at least in part to at least two circumferential outside ribs.

15. The boot according to claim 13, wherein:
the sloping section starts at a level of a bottom line and slopes straightly towards the fold region and the main axis of the boot until it smoothly fades to the middle section;
the middle section extends towards the fold region and abuts on the curved section;
the curved section turns upwardly away from the main axis towards the bottom line until it smoothly fades to the bottom of the base.

16. The boot according to claim 15, wherein the middle section is straight and in parallel with the bottom line.

17. The boot according to claim 15, wherein the middle section is concavely formed with respect to the bottom line.

18. The boot according to claim 1, wherein the circumferential outside ribs have a rectangular or trapezoidal cross-section, when viewed in a direction of the main axis of the boot.

* * * * *